US011418580B2

(12) United States Patent
Dhuse et al.

(10) Patent No.: US 11,418,580 B2
(45) Date of Patent: *Aug. 16, 2022

(54) SELECTIVE GENERATION OF SECURE SIGNATURES IN A DISTRIBUTED STORAGE NETWORK

(71) Applicant: International Business Machines Corporation, Armonk, NY (US)

(72) Inventors: Greg R. Dhuse, Chicago, IL (US); Jason K. Resch, Chicago, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 531 days.

This patent is subject to a terminal disclaimer.

(21) Appl. No.: 16/200,103

(22) Filed: Nov. 26, 2018

(65) Prior Publication Data

US 2019/0098078 A1 Mar. 28, 2019

Related U.S. Application Data

(63) Continuation-in-part of application No. 15/824,651, filed on Nov. 28, 2017, now abandoned, which is a
(Continued)

(51) Int. Cl.
*H04L 9/32* (2006.01)
*H04L 67/1004* (2022.01)
(Continued)

(52) U.S. Cl.
CPC ...... *H04L 67/1004* (2013.01); *G06F 11/1076* (2013.01); *H04L 9/085* (2013.01);
(Continued)

(58) Field of Classification Search
CPC ..... H04L 9/085; H04L 9/0891; H04L 9/0894; H04L 9/3247; H04L 67/1004;
(Continued)

(56) References Cited

U.S. PATENT DOCUMENTS 4,092,732 A 5/1978 Ouchi
5,263,085 A 11/1993 Shamir
(Continued)

FOREIGN PATENT DOCUMENTS

WO 2009048726 A1 4/2009

OTHER PUBLICATIONS

Candebat, Thibault, Cameron Ross Dunne, and David T. Gray. "Pseudonym management using mediated identity-based cryptography." In Proceedings of the 2005 workshop on Digital identity management, pp. 1-10. 2005. (Year: 2005).*
(Continued)

*Primary Examiner* — Luu T Pham
*Assistant Examiner* — Walter J Malinowski
(74) *Attorney, Agent, or Firm* — Garlick & Markison; Timothy W. Markison; Kelly H. Hale

(57) ABSTRACT

A method begins by a processing module of a dispersed storage network (DSN) receiving a signature contribution request and payload, logging the request and determining whether a timestamp for the request compares favorably to a timing template. When the timestamp for the request compares favorably to the timing template the method continues with the processing modules determining whether the request compares favorably to a functionality template and when it compares favorably to a functionality template retrieving a key share based on sharing function parameters and outputting a signature result. When the timestamp for the request does not compare favorably to the timing template or the request does not compare favorably to the functionality template the method continues with the processing module outputting a signature contribution request rejection message.

20 Claims, 7 Drawing Sheets

Related U.S. Application Data continuation-in-part of application No. 14/147,982, filed on Jan. 6, 2014, now Pat. No. 9,894,151, which is a continuation of application No. 13/413,232, filed on Mar. 6, 2012, now Pat. No. 8,627,091.

(60) Provisional application No. 61/470,524, filed on Apr. 1, 2011.

(51) Int. Cl.
  *H04N 21/8358* (2011.01)
  *H04L 67/5681* (2022.01)
  *H04L 67/1097* (2022.01)
  *H04L 9/08* (2006.01)
  *G06F 11/10* (2006.01)

(52) U.S. Cl.
  CPC .......... *H04L 9/0891* (2013.01); *H04L 9/0894* (2013.01); *H04L 9/3247* (2013.01); *H04L 67/1097* (2013.01); *H04L 67/2847* (2013.01); *H04N 21/8358* (2013.01); *H04L 2209/34* (2013.01)

(58) Field of Classification Search
  CPC ............. H04L 67/1097; H04L 67/2847; H04L 2209/34; G06F 11/1076; H04N 21/8358
  USPC .................. 713/168, 171, 176; 380/278, 279
  See application file for complete search history.

(56) References Cited

U.S. PATENT DOCUMENTS

| | | | |
|---|---|---|---|
| 5,454,101 A | 9/1995 | Mackay et al. | |
| 5,485,474 A | 1/1996 | Rabin | |
| 5,627,893 A | 5/1997 | Demytko | |
| 5,675,649 A | 10/1997 | Brennan et al. | |
| 5,774,643 A | 6/1998 | Lubbers et al. | |
| 5,802,364 A | 9/1998 | Senator et al. | |
| 5,809,285 A | 9/1998 | Hilland | |
| 5,825,880 A * | 10/1998 | Sudia | G06Q 20/3821 713/180 |
| 5,890,156 A | 3/1999 | Rekieta et al. | |
| 5,987,622 A | 11/1999 | Lo Verso et al. | |
| 5,987,633 A * | 11/1999 | Newman | H04L 43/50 379/10.03 |
| 5,991,414 A * | 11/1999 | Garay | H04L 9/302 380/30 |
| 6,012,159 A | 1/2000 | Fischer et al. | |
| 6,035,041 A * | 3/2000 | Frankel | H04L 9/302 380/28 |
| 6,058,454 A | 5/2000 | Gerlach et al. | |
| 6,088,454 A | 7/2000 | Nagashima et al. | |
| 6,092,110 A * | 7/2000 | Maria | H04L 29/06 709/225 |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,490,680 B1 | 12/2002 | Scheidt et al. | |
| 6,550,004 B1 | 4/2003 | Henry et al. | |
| 6,550,009 B1 | 4/2003 | Uranaka et al. | |
| 6,564,369 B1 * | 5/2003 | Hove | G06F 8/71 713/1 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,816,900 B1 * | 11/2004 | Vogel | H04L 9/3236 709/203 |
| 6,826,711 B2 | 11/2004 | Moulton et al. | |
| 6,879,596 B1 | 4/2005 | Dooply | |
| 6,931,549 B1 | 8/2005 | Ananda | |
| 6,947,563 B2 | 9/2005 | Fagin et al. | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,079,654 B1 | 7/2006 | Remery et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,127,067 B1 | 10/2006 | Wachtler et al. | |
| 7,136,489 B1 | 11/2006 | Madhusudhana et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,187,772 B2 | 3/2007 | Vora et al. | |
| 7,194,628 B1 | 3/2007 | Guthery | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,383,436 B2 * | 6/2008 | Srivastava | H04L 9/0827 380/277 |
| 7,636,724 B2 | 12/2009 | de la Torre et al. | |
| 7,636,764 B1 | 12/2009 | Fein et al. | |
| 8,031,875 B1 | 10/2011 | Juels et al. | |
| 8,312,532 B2 * | 11/2012 | Takeyoshi | H04L 63/061 726/15 |
| 8,520,855 B1 | 8/2013 | Kohno et al. | |
| 2001/0038696 A1 | 11/2001 | Frankel et al. | |
| 2002/0013898 A1 * | 1/2002 | Sudia | G06Q 20/02 713/155 |
| 2002/0022474 A1 * | 2/2002 | Blom | H04W 12/12 455/410 |
| 2002/0062422 A1 | 5/2002 | Butterworth et al. | |
| 2002/0104025 A1 | 8/2002 | Wrench | |
| 2002/0116611 A1 | 8/2002 | Zhou et al. | |
| 2002/0126847 A1 | 9/2002 | Wajs et al. | |
| 2002/0129087 A1 * | 9/2002 | Cachin | H04L 9/3255 709/200 |
| 2002/0141594 A1 | 10/2002 | MacKenzie et al. | |
| 2002/0166079 A1 | 11/2002 | Ulrich et al. | |
| 2003/0018927 A1 | 1/2003 | Gadir et al. | |
| 2003/0026432 A1 | 2/2003 | Woodward | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0088782 A1 | 5/2003 | Forrest | |
| 2003/0088783 A1 | 5/2003 | DiPierro | |
| 2003/0097564 A1 * | 5/2003 | Tewari | H04L 29/12113 713/171 |
| 2003/0120929 A1 | 6/2003 | Hoffstein et al. | |
| 2003/0120931 A1 | 6/2003 | Hopkins et al. | |
| 2003/0172280 A1 | 9/2003 | Scheidt et al. | |
| 2003/0194086 A1 | 10/2003 | Lambert | |
| 2004/0024963 A1 | 2/2004 | Talagala et al. | |
| 2004/0122917 A1 | 6/2004 | Menon et al. | |
| 2004/0215966 A1 | 10/2004 | Buxton et al. | |
| 2004/0228493 A1 | 11/2004 | Ma | |
| 2005/0054343 A1 * | 3/2005 | Nykanen | H04W 80/04 455/432.3 |
| 2005/0056141 A1 * | 3/2005 | Uehara | G10H 1/0066 84/645 |
| 2005/0080746 A1 | 4/2005 | Zhu et al. | |
| 2005/0100022 A1 | 5/2005 | Ramprashad | |
| 2005/0108551 A1 * | 5/2005 | Toomey | G06F 21/33 713/185 |
| 2005/0114594 A1 | 5/2005 | Corbett et al. | |
| 2005/0117513 A1 * | 6/2005 | Park | H04L 43/026 370/230 |
| 2005/0125593 A1 | 6/2005 | Karpoff et al. | |

(56) References Cited

U.S. PATENT DOCUMENTS

| | | |
|---|---|---|
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0195973 A1 | 9/2005 | Ibrahim |
| 2005/0229069 A1 | 10/2005 | Hassner et al. |
| 2005/0240591 A1 | 10/2005 | Marceau et al. |
| 2005/0262038 A1 | 11/2005 | Sepez et al. |
| 2006/0015736 A1* | 1/2006 | Callas .................. H04L 9/3247 713/176 |
| 2006/0034494 A1 | 2/2006 | Holloran |
| 2006/0047907 A1 | 3/2006 | Shiga et al. |
| 2006/0075246 A1 | 4/2006 | Suga |
| 2006/0080536 A1* | 4/2006 | Teppler ................. H04L 9/3218 713/176 |
| 2006/0130154 A1 | 6/2006 | Lam et al. |
| 2006/0136448 A1 | 6/2006 | Cialini et al. |
| 2006/0153364 A1 | 7/2006 | Beeson |
| 2006/0156059 A1 | 7/2006 | Kitamura |
| 2006/0177061 A1 | 8/2006 | Orsini et al. |
| 2006/0224603 A1 | 10/2006 | Correll |
| 2006/0236056 A1 | 10/2006 | Nagata |
| 2007/0016776 A1 | 1/2007 | Lucidarme |
| 2007/0041554 A1* | 2/2007 | Newman ................. H04L 43/50 379/218.01 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0101140 A1 | 5/2007 | Rhoads |
| 2007/0101392 A1* | 5/2007 | Soin ........................ H04N 5/85 725/132 |
| 2007/0116269 A1 | 5/2007 | Nochta |
| 2007/0130084 A1 | 6/2007 | Kay et al. |
| 2007/0160198 A1* | 7/2007 | Orsini ................... H04L 9/3247 380/28 |
| 2007/0174192 A1 | 7/2007 | Gladwin et al. |
| 2007/0180259 A1 | 8/2007 | Bulot et al. |
| 2007/0213125 A1* | 9/2007 | Szrek ..................... G07F 17/329 463/29 |
| 2007/0214285 A1 | 9/2007 | Au et al. |
| 2007/0223706 A1 | 9/2007 | Gantman et al. |
| 2007/0234110 A1 | 10/2007 | Soran et al. |
| 2007/0283167 A1 | 12/2007 | Venters et al. |
| 2008/0010218 A1* | 1/2008 | Zank ....................... G06F 21/64 705/75 |
| 2008/0019352 A1* | 1/2008 | Bennett ................. H04L 63/145 370/352 |
| 2008/0147861 A1* | 6/2008 | Oishi ..................... G06F 21/565 709/225 |
| 2008/0181413 A1* | 7/2008 | Yi ........................... H04L 9/085 380/279 |
| 2008/0183992 A1* | 7/2008 | Martin ..................... G06F 3/064 711/E12.103 |
| 2008/0222418 A1* | 9/2008 | Futa ..................... G06F 9/30007 713/176 |
| 2008/0226065 A1 | 9/2008 | Zunke |
| 2008/0320097 A1* | 12/2008 | Sawicki ................. G06F 3/0607 709/216 |
| 2009/0003663 A1 | 1/2009 | Webster |
| 2009/0077371 A1* | 3/2009 | Powell ................... H04L 9/083 713/152 |
| 2009/0080659 A1 | 3/2009 | Elder et al. |
| 2009/0094251 A1 | 4/2009 | Gladwin et al. |
| 2009/0094318 A1 | 4/2009 | Gladwin et al. |
| 2009/0132830 A1 | 5/2009 | Haga et al. |
| 2009/0168723 A1* | 7/2009 | Meylan ................. H04L 1/1874 370/331 |
| 2009/0254750 A1 | 10/2009 | Bono et al. |
| 2009/0265555 A1 | 10/2009 | Royer |
| 2009/0288165 A1* | 11/2009 | Qiu ........................ H04L 63/14 726/23 |
| 2009/0300362 A1 | 12/2009 | Shaik |
| 2009/0323972 A1 | 12/2009 | Kohno et al. |
| 2010/0023524 A1 | 1/2010 | Gladwin et al. |
| 2010/0023771 A1 | 1/2010 | Struik |
| 2010/0037055 A1* | 2/2010 | Fazio .................... H04L 9/3255 713/171 |
| 2010/0037056 A1 | 2/2010 | Follis et al. |
| 2010/0049984 A1* | 2/2010 | Masushio ............. H04L 9/0861 713/179 |
| 2010/0054481 A1 | 3/2010 | Jajodia et al. |
| 2010/0070755 A1* | 3/2010 | Himawan ............... H04L 63/12 713/153 |
| 2010/0131755 A1 | 5/2010 | Zhu et al. |
| 2010/0161817 A1 | 6/2010 | Xiao et al. |
| 2010/0180116 A1* | 7/2010 | Coan ..................... H04L 9/0891 713/168 |
| 2010/0228650 A1* | 9/2010 | Shacham ............... G06F 16/2455 705/34 |
| 2010/0235638 A1* | 9/2010 | Irvine ...................... H04L 9/085 713/168 |
| 2010/0241848 A1* | 9/2010 | Smith ..................... H04L 9/0891 713/153 |
| 2010/0242101 A1 | 9/2010 | Reese, Jr. |
| 2010/0262837 A1 | 10/2010 | Kulin |
| 2010/0266120 A1 | 10/2010 | Leggette et al. |
| 2010/0266132 A1 | 10/2010 | Bablani et al. |
| 2010/0268966 A1 | 10/2010 | Leggette et al. |
| 2010/0269008 A1* | 10/2010 | Leggette ................. G06F 21/78 714/752 |
| 2010/0275026 A1 | 10/2010 | Mclean |
| 2011/0047380 A1 | 2/2011 | Miller |
| 2011/0055578 A1 | 3/2011 | Resch |
| 2011/0096668 A1* | 4/2011 | Bloch .................... H04L 45/38 370/237 |
| 2011/0099203 A1 | 4/2011 | Fastring |
| 2011/0113427 A1* | 5/2011 | Dotan ..................... G06F 21/53 718/1 |
| 2011/0118861 A1* | 5/2011 | Koike ................. G10H 1/0058 700/94 |
| 2011/0126295 A1 | 5/2011 | Resch |
| 2011/0161293 A1* | 6/2011 | Vermeulen ............ G06F 16/184 707/626 |
| 2011/0173126 A1* | 7/2011 | Knapp ................... G06Q 30/02 705/71 |
| 2011/0191156 A1* | 8/2011 | Etheredge .......... G06Q 30/0224 705/14.25 |
| 2011/0208970 A1 | 8/2011 | Brown et al. |
| 2011/0213975 A1* | 9/2011 | Sorniotti ............... H04L 63/104 713/169 |
| 2012/0089659 A1* | 4/2012 | Halevi ................. G06F 3/04842 709/201 |
| 2012/0102286 A1 | 4/2012 | Holt et al. |
| 2012/0179913 A1* | 7/2012 | Kirk ...................... H04L 9/3247 713/176 |
| 2012/0254850 A1* | 10/2012 | Hido ..................... G06F 21/566 717/168 |
| 2012/0303963 A1* | 11/2012 | Murao ................... H04L 9/3263 713/178 |
| 2014/0068260 A1 | 3/2014 | Oney et al. |
| 2020/0076732 A1* | 3/2020 | Yang .................. H04L 12/4641 |

OTHER PUBLICATIONS

Amir, Yair, Claudiu Danilov, Jonathan Kirsch, John Lane, Danny Dolev, Cristina Nita-Rotaru, Josh Olsen, and David Zage. "Scaling byzantine fault-tolerant replication towide area networks." In International Conference on Dependable Systems and Networks (DSN'06), pp. 105-114. IEEE, 2006. (Year: 2006).*

Cachin, Christian, Klaus Kursawe, and Victor Shoup. "Random oracles in Constantinople: Practical asynchronous Byzantine agreement using cryptography." Journal of Cryptology 18, No. 3 (2005): 219-246. (Year: 2005).*

Liu, Zhiyuan, Yunfang Feng, and Jun Li. "Efficient Id-Based Threshold Signature in P2P and MANETs." In 2008 4th International Conference on Wireless Communications, Networking and Mobile Computing, pp. 1-4. IEEE, 2008. (Year: 2008).*

(56) References Cited

OTHER PUBLICATIONS

Kim, Sundeuk, Hyun-Taek Oh, and Young-Gab Kim. "Certificate sharing system for secure certificate distribution in mobile environment." Expert Systems with Applications 44 (2016): 67-77. (Year: 2016).*

Bye, Rainer, Seyit A. Camtepe, and Sahin Albayrak. "Design and modeling of collaboration architecture for security." In 2009 International Symposium on Collaborative Technologies and Systems, pp. 330-341. IEEE, 2009. (Year: 2009).*

Bhargavan, Karthikeyan, Ricardo Corin, Pierre-Malo Denielou, Cedric Fournet, and James J. Leifer. "Cryptographic protocol synthesis and verification for multiparty sessions." In 2009 22nd IEEE Computer Security Foundations Symposium, pp. 124-140. IEEE, 2009. (Year: 2009).*

Ding, Xuhua. Fine-grained control of security services. University of Southern California, 131 pages, 2003. (Year: 2003).*

Boneh D., Boyen X., Halevi S. (2006) Chosen Ciphertext Secure Public Key Threshold Encryption Without Random Oracles. In: Pointcheval D. (eds) Topics in Cryptology—CT-RSA 2006. CT-RSA 2006. Lecture Notes in Computer Science, vol. 3860. Springer, Berlin, Heidelberg.

Zhu, "Analyzing Euler-Fermat Theorem Based Multicast Key Distribution Schemes with Chinese Remainder Theorem", 2008 IFIP International Conference on Network and Parallel Computing, 2008, pp. 11-17.

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Li, "A Novel Pairwise Keys Pre-Distribution Scheme Based on Binary Tree in Wireless Sensor Networks", 2006 6th International Conference on ITS Telecommunications Proceedings, 2006, IEEE, pp. 913-916.

Libert, "Adaptively Secure Non-Interactive Threshold Cryptosystems", International Colloquium on Automata, Languages, and Programming, 2011, pp. 588-600.

Libert, "Non-Interactive CCA-Secure Threshold Cryptosystems with Adaptive Security: New Framework and Constructions" ,Theory of Cryptography. 2012, pp. 75-93.

Nyang, "Knowledge-Proof Based Versatile Smart Card Verification Protocol", ACM Computer Communication Review, 2000, pp. 39-44.

Ong, "Optimizing Robustness while Generating Shared Secret Safe Primes", University of California, Berkeley, 2005, 18 pages.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Rhea, "Pond: the OceanStore Prototype", University of California, Berkeley, Jan. 6, 2003, 34 pages.

Rhea, "The OceanStore Write Path", University of California, Berkeley, Jun. 11, 2002, 43 pages.

Satran, et al.; Internet Small Computer Systems Interface (iSCSI); IETF Network Working Group; RFC 3720; Apr. 2004; pp. 1-257.

Schnitzer, "Secured Storage Using Secure Parser", StorageSS05, Nov. 11, 2015, Fairfax, Virginia, USA,. pp. 135-140.

Sciberras; Lightweight Directory Access Protocol (LDAP): Schema for User Applications; IETF Network Working Croup; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wiegand, "Scalable Video Coding for IPTV Services", IEEE Transactions on Broadcasting, vol. 55, No. 2, Jun. 2009, pp. 527-538.

Wildi; Java iSCSi Initiator; Master Thesis; Department of Computer and Information Science, University of Konstanz; Feb. 2007; 60 pgs.

Zeilenga; Lightweight Directory Access Protocol (LDAP): String Representation of Distinguished Names; IETF Network Working Group; RFC 4514; Jun. 2006; pp. 1-15.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

* cited by examiner

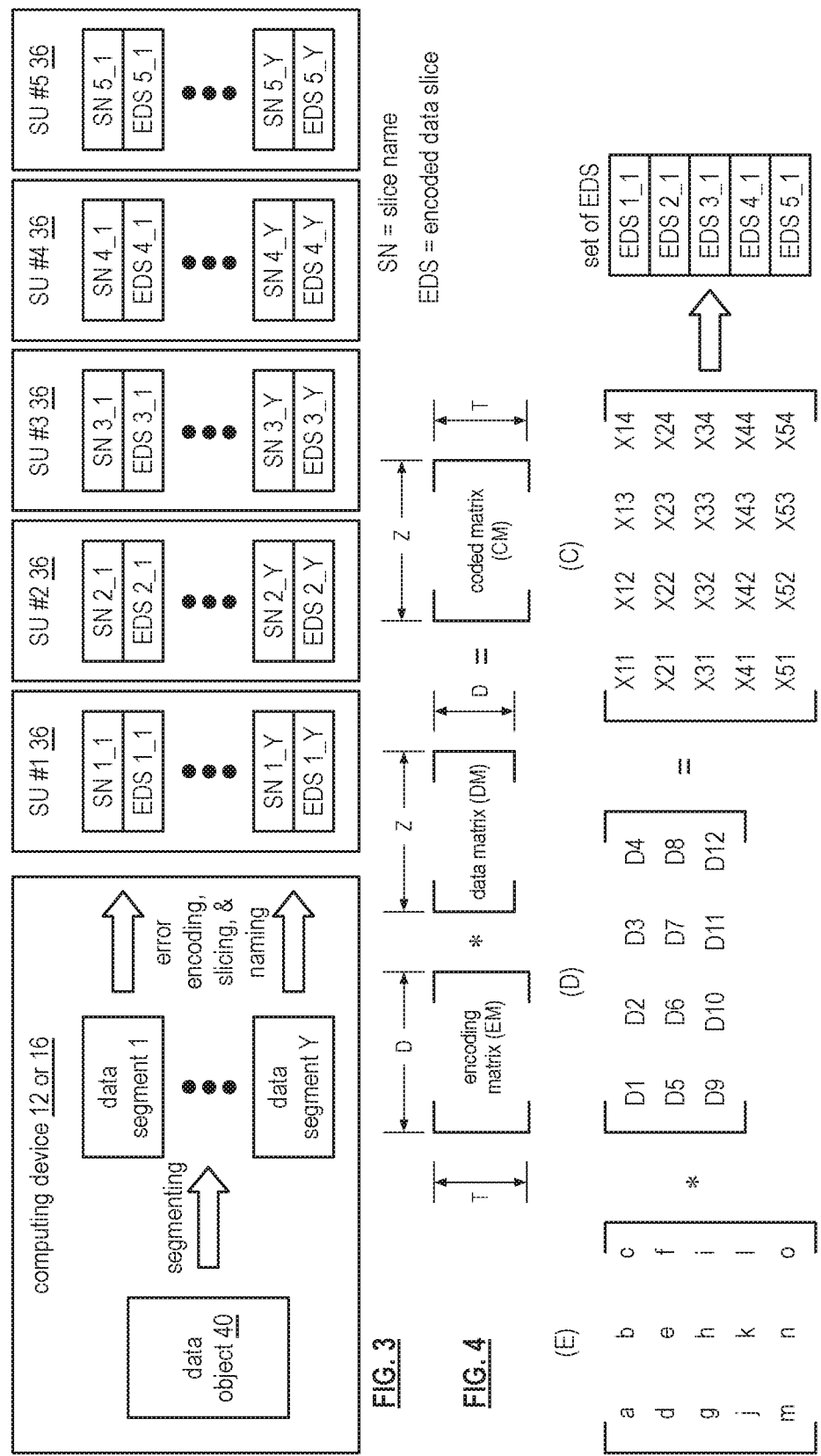

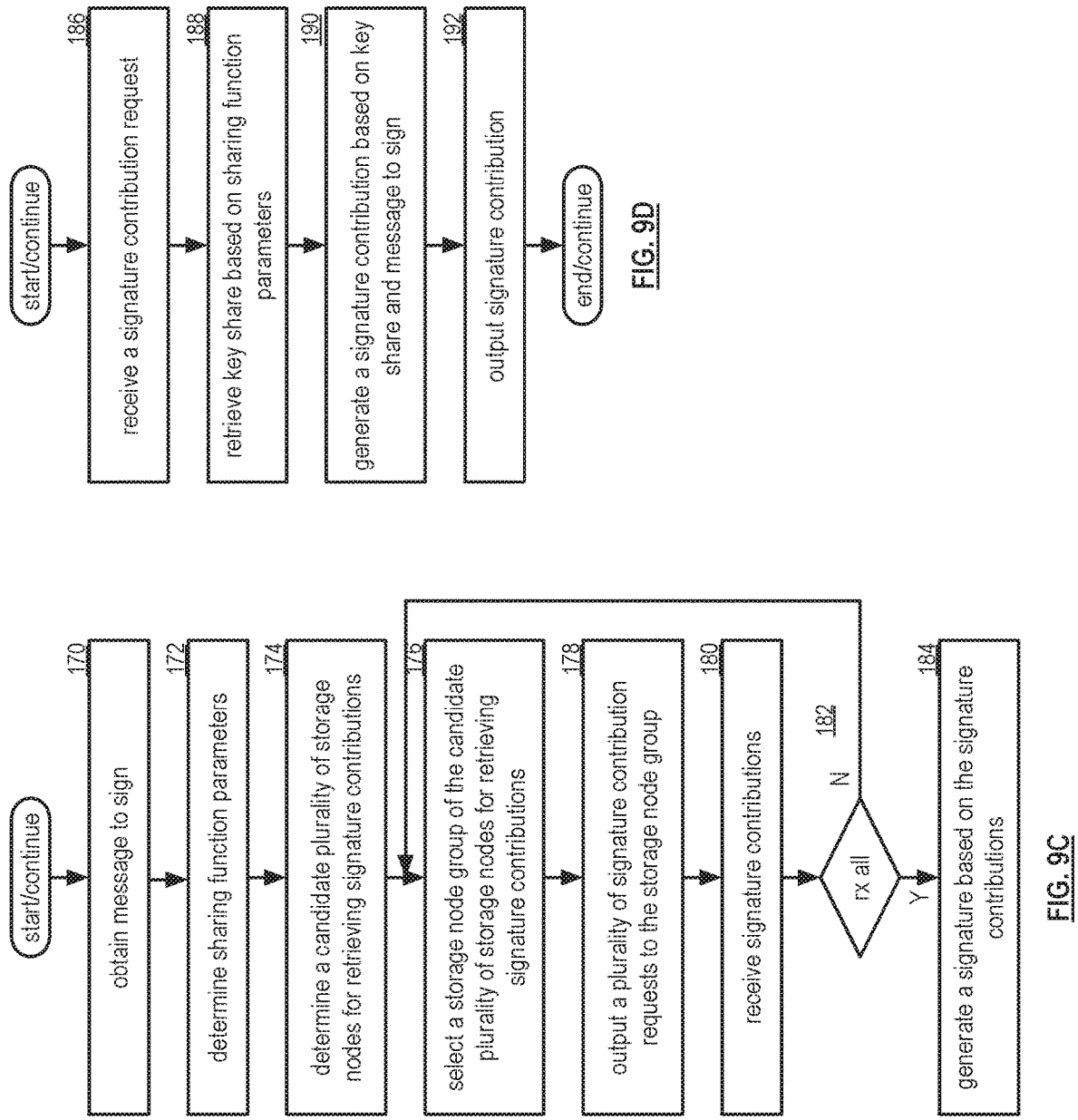

SELECTIVE GENERATION OF SECURE SIGNATURES IN A DISTRIBUTED STORAGE NETWORK

CROSS REFERENCE TO RELATED PATENTS

The present U.S. Utility patent application claims priority pursuant to 35 U.S.C. § 120 as a continuation-in-part of U.S. Utility application Ser. No. 15/824,651, entitled "MAINTAINING REFERENCES TO RELATED OBJECTS IN A DISTRIBUTED STORAGE NETWORK", filed Nov. 28, 2017, which is a continuation-in-part of U.S. Utility application Ser. No. 14/147,982, entitled "GENERATING A SECURE SIGNATURE UTILIZING A PLURALITY OF KEY SHARES", filed Jan. 6, 2014, issued as U.S. Pat. No. 9,894,151 on Feb. 13, 2018, which is a continuation of U.S. Utility patent application Ser. No. 13/413,232, entitled "GENERATING A SECURE SIGNATURE UTILIZING A PLURALITY OF KEY SHARES," filed Mar. 6, 2012, issued as U.S. Pat. No. 8,627,091 on Jan. 7, 2014, which claims priority pursuant to 35 U.S.C. § 119(e) to U.S. Provisional Application No. 61/470,524, entitled "ENCODING DATA STORED IN A DISPERSED STORAGE NETWORK,", filed Apr. 1, 2011, all of which are hereby incorporated herein by reference in their entirety and made part of the present U.S. Utility patent application for all purposes.

INCORPORATION-BY-REFERENCE OF MATERIAL SUBMITTED ON A COMPACT DISC

Not applicable.

STATEMENT REGARDING FEDERALLY SPONSORED RESEARCH OR DEVELOPMENT

Not Applicable

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9C is a flowchart illustrating an example of generating a signature in accordance with the present invention;

FIG. 9D is a flowchart illustrating an example of generating a signature contribution in accordance with the present invention.

DETAILED DESCRIPTION OF THE INVENTION

Figure 1:
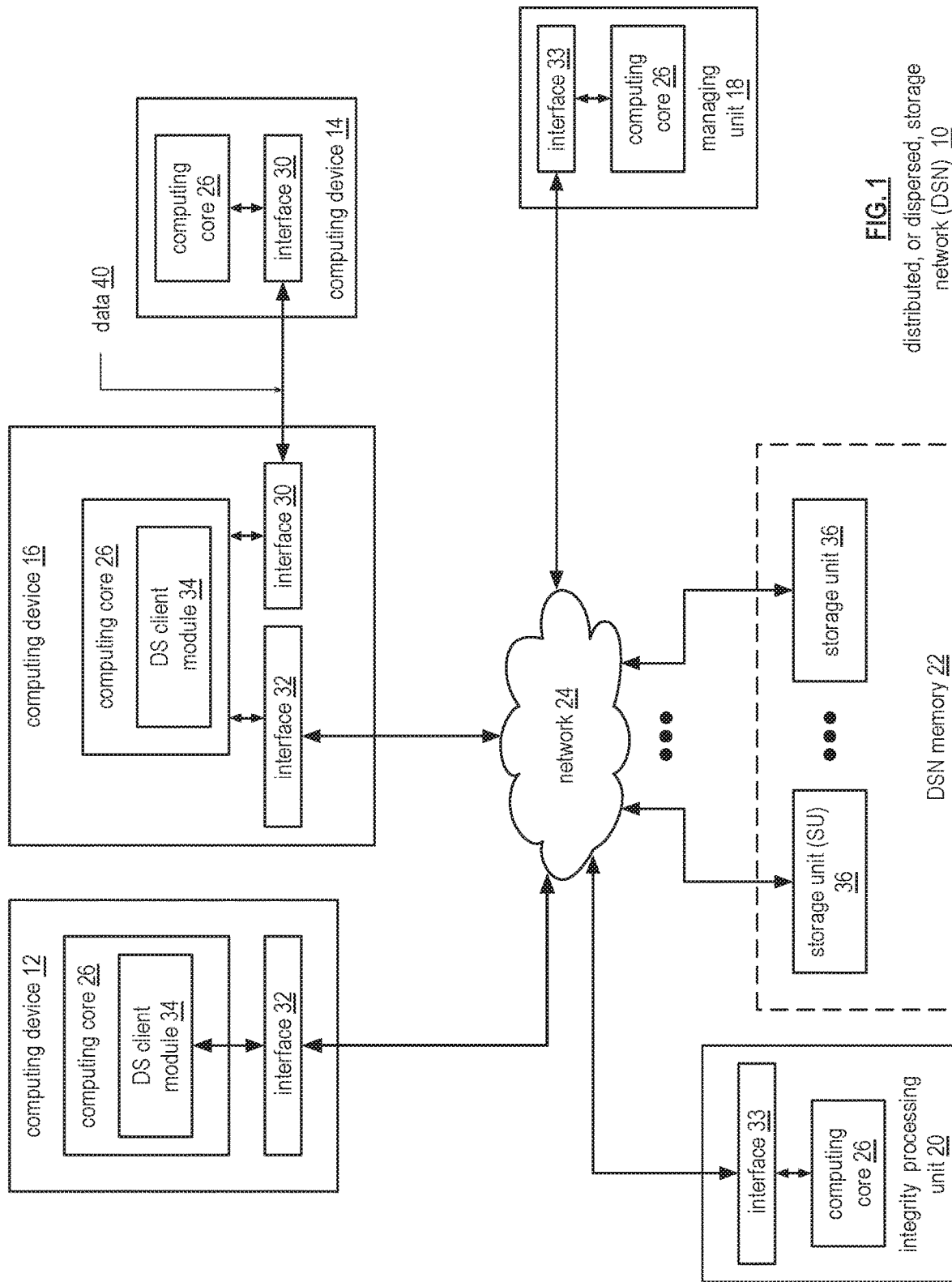
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
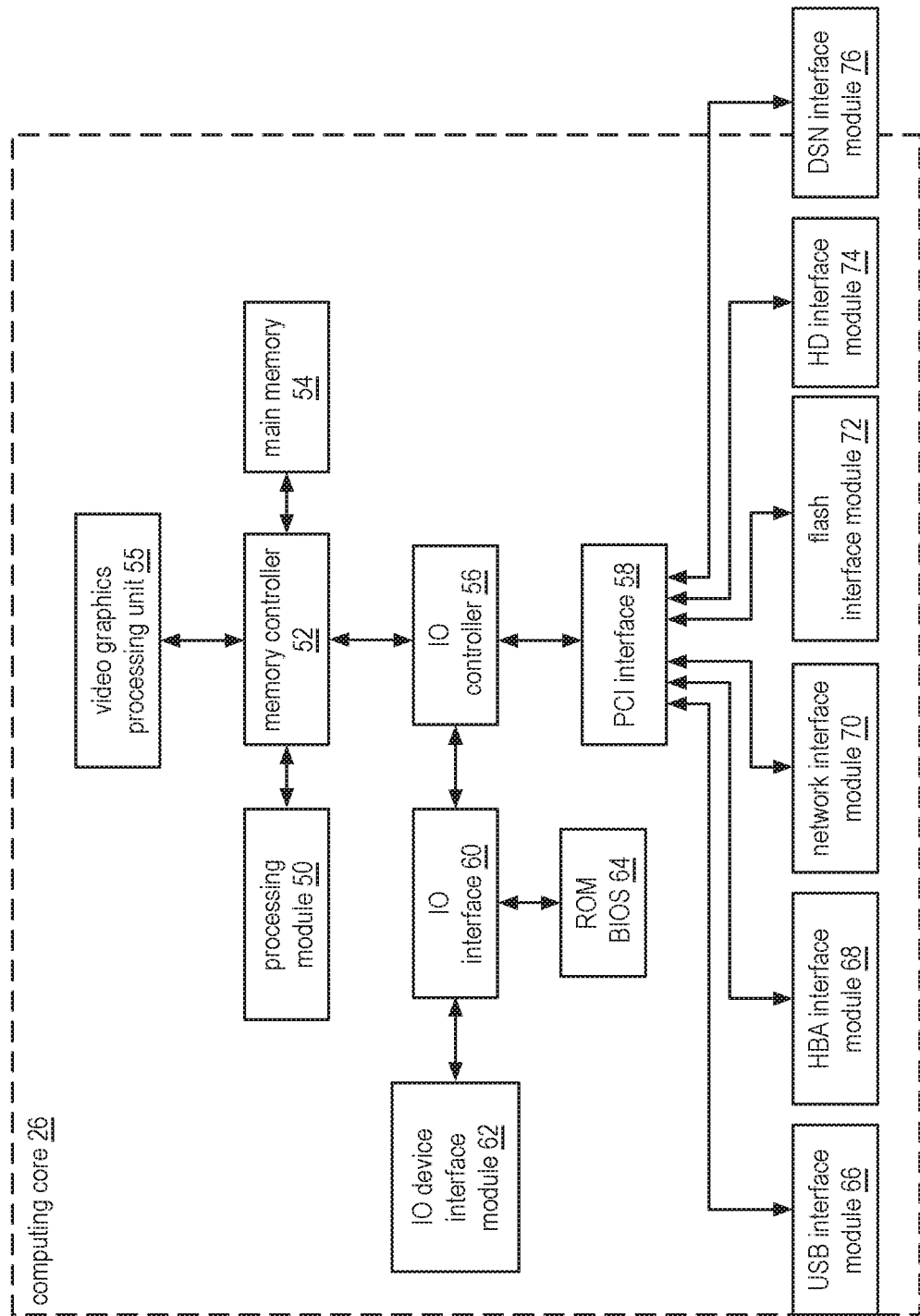
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
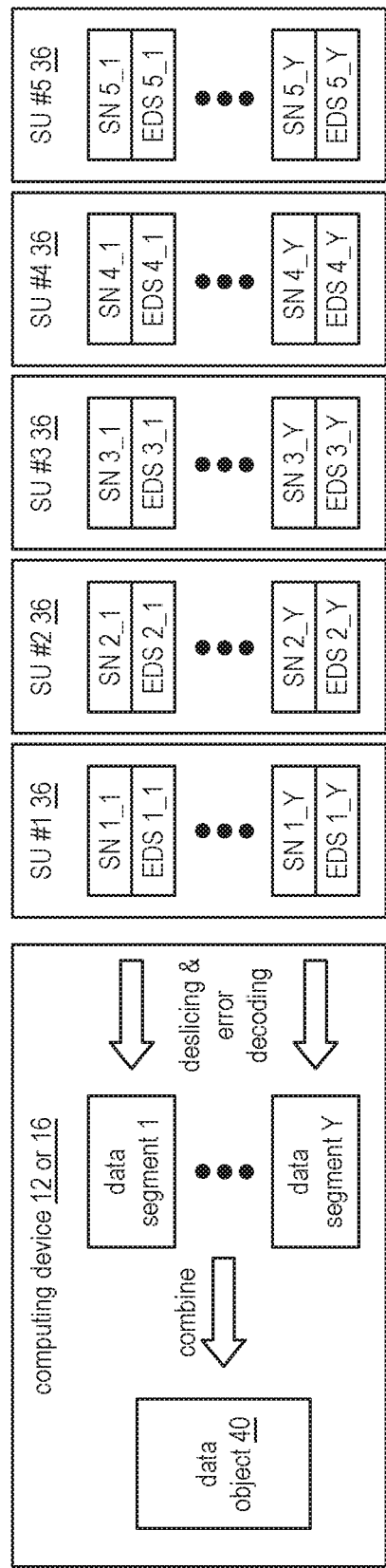
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
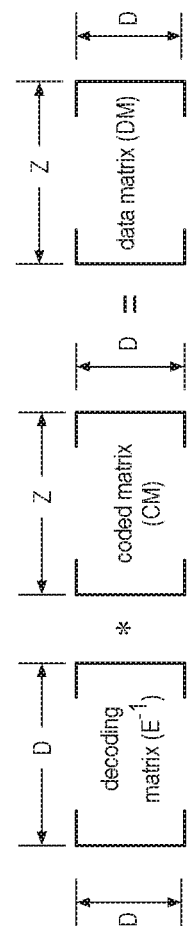
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figures 9A, 9B:
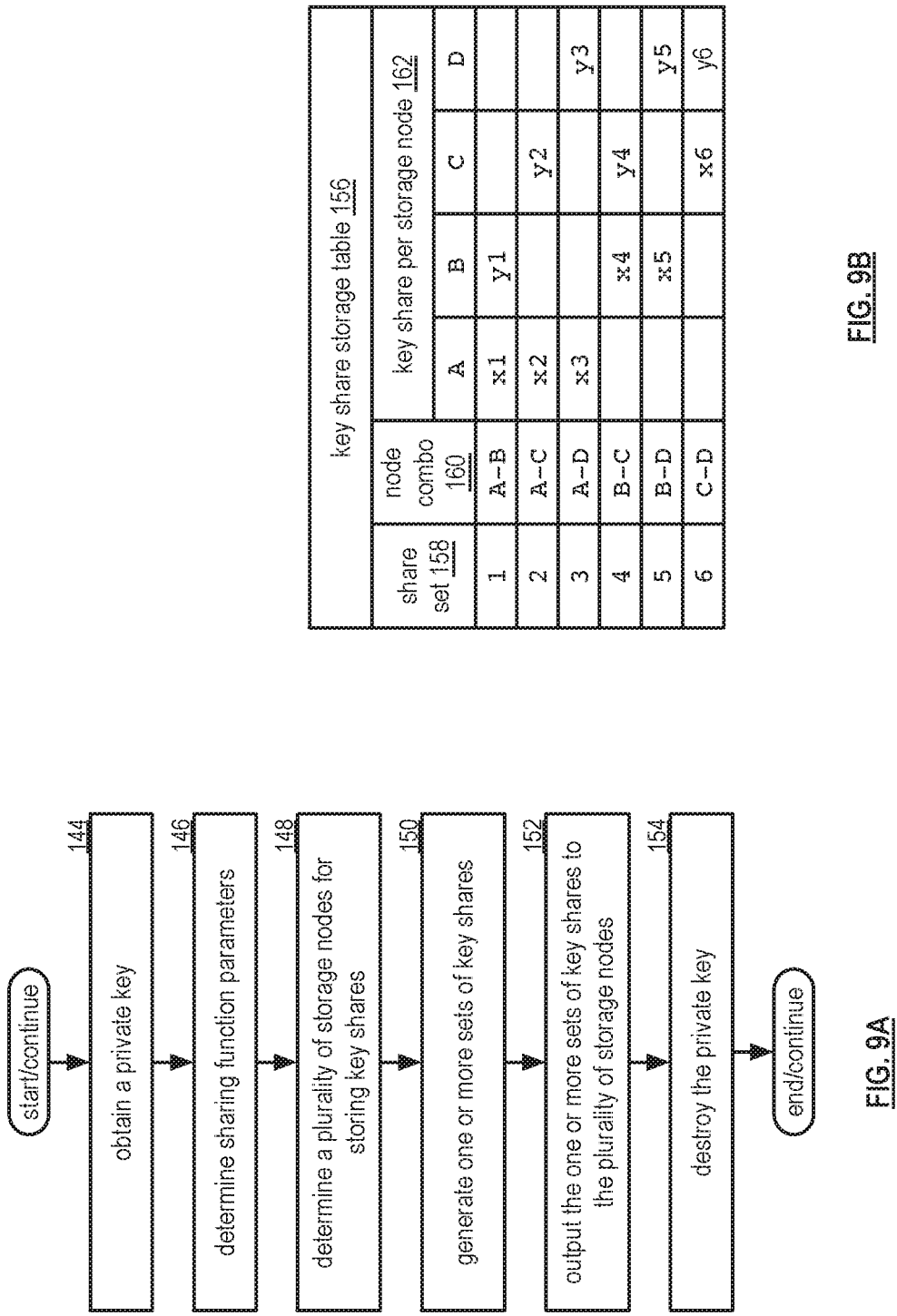
FIG. 9A is a flowchart illustrating an example of storing key shares in accordance with the present invention.
FIG. 9B is a diagram illustrating an example of a key share storage table in accordance with the present invention.

FIG. 9A is a flowchart illustrating an example of storing key shares. FIG. 9A is a flowchart illustrating an example of storing key shares. Storage of secrets in multiple storage nodes can be used to prevent the capture of the ciphertext and the subsequent cryptanalysis on that ciphertext. In such a system decrypting an encrypted message or signing a message involves several parties (more than some threshold number) who must cooperate in the decryption or signature protocol. In an example, a message is encrypted using a public key and the corresponding private key is shared among the participating parties. Multiple schemes and algorithms are available for implementing these "threshold signature" cryptosystems. For example, one such system is based on distributing secret shares of a private key (see, for example, "Practical Threshold Signatures" by Victor Shoup, et. al). Another example is based on the Boneh-Lynn-Shacham (BLS) Signature Scheme (using threshold signatures based on bi-linear pairings). Yet another example is the various threshold signature schemes where shares are produced from linear functions applied to a private key. Many more examples will be readily apparent to those skilled in the related technology space. In an example, some signature are algorithms distinct from Rivest-Shamir-Adleman (RSA) type cryptosystems.

In many of the systems referred to above the participants/nodes need not be pre-established before the threshold cryptosystem(s) are employed. Instead, a single share value generated from a key is sufficient to be used with virtually any combination of servers used to produce a particular signature.

The method begins with step 144 where a processing module determines a private key (e.g., an encryption key d utilized in an encryption algorithm). Such a determination may be based on one or more of generating a key pair (e.g., a private key and a key), receiving the private key, a query, a lookup, and a user input. The method continues at step 146 where the processing module determines sharing function parameters. Such sharing function parameters includes one or more of a width (e.g., a number of storage nodes w), a decode threshold (e.g., a number of key shares k), a number of shares sets (e.g., w choose k), a public modulus n, security function constants p and q (e.g., large primes such that $p*q=n$), an encryption algorithm identifier, and a decryption algorithm identifier. Such a determination may be based on one or more of a list, a predetermination, a query, a performance level indicator, a reliability level requirement, a message, and a command. For example, the processing module determines w=4, k=2, a number of shares sets=(4 choose 2)=6, a value for n, and a value for p based on a lookup and generates a value for q in accordance with $p*q=n$.

The method continues at step 148 where the processing module determines a plurality of storage nodes for storing key shares. Such plurality of storage nodes includes two or more of a user device, a dispersed storage (DS) unit, a storage server, and a memory device. Such a determination may be based on one or more of the sharing function parameters, a list, a predetermination, a query, a performance level indicator, a message, and a command. For example, the processing module determines the plurality of storage nodes to include 4 DS units when the sharing function parameters include a width w=4 and a performance level indicator indicates that a performance level of the 4 DS units compares favorably to a performance level threshold.

The method continues at step 150 where the processing module generates one or more sets of key shares to include the number of shares sets. For example, the processing module generates 6 sets of key shares when the width w=4 and the decode threshold k=2 (e.g., 4 choose 2=6). Such a generation produces a set of key shares for each combination of a decode threshold k number of key shares stored in the width w number of storage nodes. Such generation of each set of key shares includes generation in accordance with a formula $(x+y+z)$ mod $\Phi$ (n)=private key d, wherein $\Phi$ (n)=(p−1)*(q−1), and x, y, z represent key shares of a corresponding key share set when a number of key shares is three. For example, the processing module randomly chooses values for key shares y and z of a corresponding key share set and generates a value for key share x in accordance with the formula.

In an example of generating key share sets, the processing module generates 10 key shares sets to include a first key share set that includes a key share x1 to store in DS unit 1, a key share y1 to store in DS unit 2, and a key share z1 to store in DS unit 3, a second key share set that includes a key share x2 to store in DS unit 1, a key share y2 to store in DS unit 2, and a key share z2 to store in DS unit 4, a third key share set that includes a key share x3 to store in DS unit 1, a key share y3 to store in DS unit 2, and a key share z3 to store in DS unit 5, a fourth key share set that includes a key share x4 to store in DS unit 1, a key share y4 to store in DS unit 3, and a key share z4 to store in DS unit 5, a fifth key share set that includes a key share x5 to store in DS unit 1, a key share y5 to store in DS unit 4, and a key share z5 to store in DS unit 5, a sixth key share set that includes a key share x6 to store in DS unit 2, a key share y6 to store in DS unit 3, and a key share z6 to store in DS unit 4, a seventh key share set that includes a key share x7 to store in DS unit 2, a key share y7 to store in DS unit 3, and a key share z7 to store in DS unit 5, an eighth key share set that includes a key share x8 to store in DS unit 2, a key share y7 to store in DS unit 4, and a key share z7 to store in DS unit 5, a ninth key share set that includes a key share x9 to store in DS unit 3, a key share y9 to store in DS unit 4, and a key share z9 to store in DS unit 5, and a 10th key share set that includes a key share x10 to store in DS unit 1, a key share y10 to store in DS unit 3, and a key share z10 to store in DS unit 4 when a number storage nodes is 5 and a decode threshold is 3.

The method continues at step 152 where the processing module outputs the one or more sets of key shares to the plurality of storage nodes. In addition, the processing module may output one or more of the sharing function parameters to each storage node of the plurality of storage nodes. For example, the processing module sends the public modulus n to each storage node of the plurality of storage nodes. The method continues at step 154 where the processing module destroys the private key d. Note that such destroying of the private key may provide the system with a security performance improvement. A method to generate a signature based on stored shared keys is described in greater detail with reference to FIG. 9C. A method to generate a signature contribution (e.g., by a storage node) is described in greater detail with reference to FIG. 9D.

FIG. 9B is a diagram illustrating an example of a key share storage table 156 that includes a share set field 158, a node combination field 160, and a key share per storage node field 162. Such a share set field 158 includes a share sets number of share set identifiers of corresponding key share sets. For example, the share set field 158 includes 6 share set identifiers 1-6 when a number of storage nodes w=4, a decode threshold k=2, and the share sets number of share set identifiers is w choose k (e.g., 4 choose 2=6). Such a node combination field 160 includes a share sets number of node combination entries, wherein each node combination entry corresponds to a combination of a decode threshold number of storage node identifiers. For example, the node combination field 160 includes 6 node combination entries including A-B, A-C, A-D, B-C, B-D, and C-D when storage nodes A-D are utilized to store a share sets number (e.g., 6) of a decode threshold number (e.g., 2) of key shares.

Such a key share per storage node field 162 includes a share sets number of storage node fields, wherein each storage node field corresponds to a storage node of a number of storage nodes w utilized to store the key shares. Each storage node field includes a key share identifier utilized to identify a key share of an associated share set that is stored in a storage node corresponding to the storage node field. For example, share set 1 includes utilization of storage node combination A-B such that key share x1 is stored in storage unit A and key share y1 is stored in storage node B, share set 2 includes utilization of storage node combination A-C such that key share x2 is stored in storage unit A and key share y2 is stored in storage node C, share set 3 includes utilization of storage node combination A-D such that key share x3 is stored in storage unit A and key share y3 is stored in storage node D, share set 4 includes utilization of storage node combination B-C such that key share x4 is stored in storage unit B and key share y4 is stored in storage node C, share set 5 includes utilization of storage node combination B-D such that key share x5 is stored in storage unit B and key share y5 is stored in storage node D, and share set 6 includes utilization of storage node combination C-D such that key share x6 is stored in storage unit C and key share y6 is stored in storage node D. Each set of key shares may be generated in accordance with a formula $(x+y) \mod \Phi(n) =$ private key d, wherein $\Phi(n)=(p-1)*(q-1)$. For example, a value of key share y1 is chosen randomly and a value for key share x1 is generated in accordance with the formula.

FIG. 9C is a flowchart illustrating an example of generating a signature, which include similar steps to FIG. 9A. The method begins with step 170 where a processing module obtains a message to sign. Such a message may include a data file, data object, a data file hash, a data object cache, a data block, and a hash of a data block, a hash of a payload. Such a payload may include one or more of registry information, key information, encryption algorithm information, a device certificate, a user certificate, and a system element identifier (ID). The method continues with step 172 where the processing module determines sharing function parameters.

The method continues at step 174 where the processing module determines a candidate plurality of storage nodes for retrieving signature contributions. Such a determination may be based on one or more of a list of storage nodes utilized to store key shares, a lookup, a command, a query, and a message. The method continues at step 176 where the processing module selects a storage node group of the candidate plurality of storage nodes for retrieving signature contributions. Such a storage node group includes at least a decode threshold number of storage nodes. Such a determination may be based on one or more of a storage node status indicator, a storage node performance level indicator, a retrieval history indicator, a security indicator, a query, a command, a key share storage table lookup, and a message. For example, the processing module determines the storage node group to include storage nodes A and D based on the key share storage table lookup and a retrieval history indicator for storage nodes A and D that indicates a favorable retrieval history level.

The method continues at step 178 where the processing module outputs a plurality of signature contribution requests to the storage node group. Such a request of the plurality requests may include one or more of a share set ID, a storage node group ID, the message to sign, and at least one parameter of the sharing function parameters. For example, the processing module outputs signature contribution requests to storage nodes A and B, wherein each signature contribution request includes a share set ID of A-D, a public modulus n, and a message to sign that includes a hash of a device certificate.

The method continues at step 180 where the processing module receives one or more signature contributions. The method continues at step 182 where the processing module determines whether all of a decode threshold number of signature contributions has been received. The method repeats back to step 176 where the processing module selects the storage node group when the processing module determines that all of the decode threshold number of signature contributions has not been received. The method continues to step 182 when the processing module determines that all of the decode threshold number of signature contributions has been received. In step 184 the processing module generates a signature based on the signature contributions. Such generation includes generating the signature in accordance with the formula signature s=((signature contribution A)*(signature contribution B)) mod n, when the decode threshold is 2 and signature contributions A and B have been received (e.g., from storage nodes A and B). In addition, the processing module may verify the signature. Such verification includes decrypting the signature utilizing an associated public key to produce a decrypted signature and comparing the decrypted signature to the message to sign (e.g., the hash of the device certificate). The processing module determines that the signature is valid when the comparisons favorable (e.g., substantially the same). The method repeats back to step 176 where the processing module selects a storage node group to select a different storage node group and repeat the process to re-generate the signature when the processing module determines that the signature is not valid.

FIG. 9D is a flowchart illustrating an example of generating a signature contribution. The method begins with step 186 where a processing module receives a signature contribution request. The method continues at step 188 where the processing module retrieves a key share based on sharing function parameters. The processing module obtains the sharing function parameters based on one or more of receiving the sharing function parameters, extracting the sharing function parameters from the request, a lookup, a message, a command, and a predetermination. For example, the processing module extracts the sharing function parameters from the signature contribution request to include a key share ID. Such retrieving of the key share includes obtaining the key share ID and retrieving the key share based on the key share ID. For example, the processing module obtains key share ID x3, determines a storage node A memory location based on the key share ID x3, and retrieves the key share x3 from a memory of the storage node at the storage node memory location.

As another example, the processing module extracts the sharing function parameters from the signature contribution request to include a share set ID. Such retrieving of the key share includes obtaining the share set ID and retrieving the key share based on the share set ID and a key share storage table lookup. For example, the processing module obtains share set ID A-D, determines a key share ID of x3 based on a key share storage table lookup utilizing the share set ID A-D as an index, determines a storage node A memory location based on the key share ID x3, and retrieves the key share x3 from a memory of the storage node at the storage node memory location.

The method continues at step 190 where the processing module generates a signature contribution based on the key share and a message to sign m. Obtaining the message to sign m includes at least one of extracting the message to sign m from the signature contribution request and generating a hash of a payload from the signature contribution request. Such generation of the signature contribution includes generating the signature contribution in accordance with the formula signature contribution=mx mod n. For example, the processing module generates the signature contribution in accordance with signature contribution A=mx3 mod n, when the processing module is associated with storage node A and the key share is x3. The method continues at step 192 where the processing module outputs the signature contribution.

Figure 10:
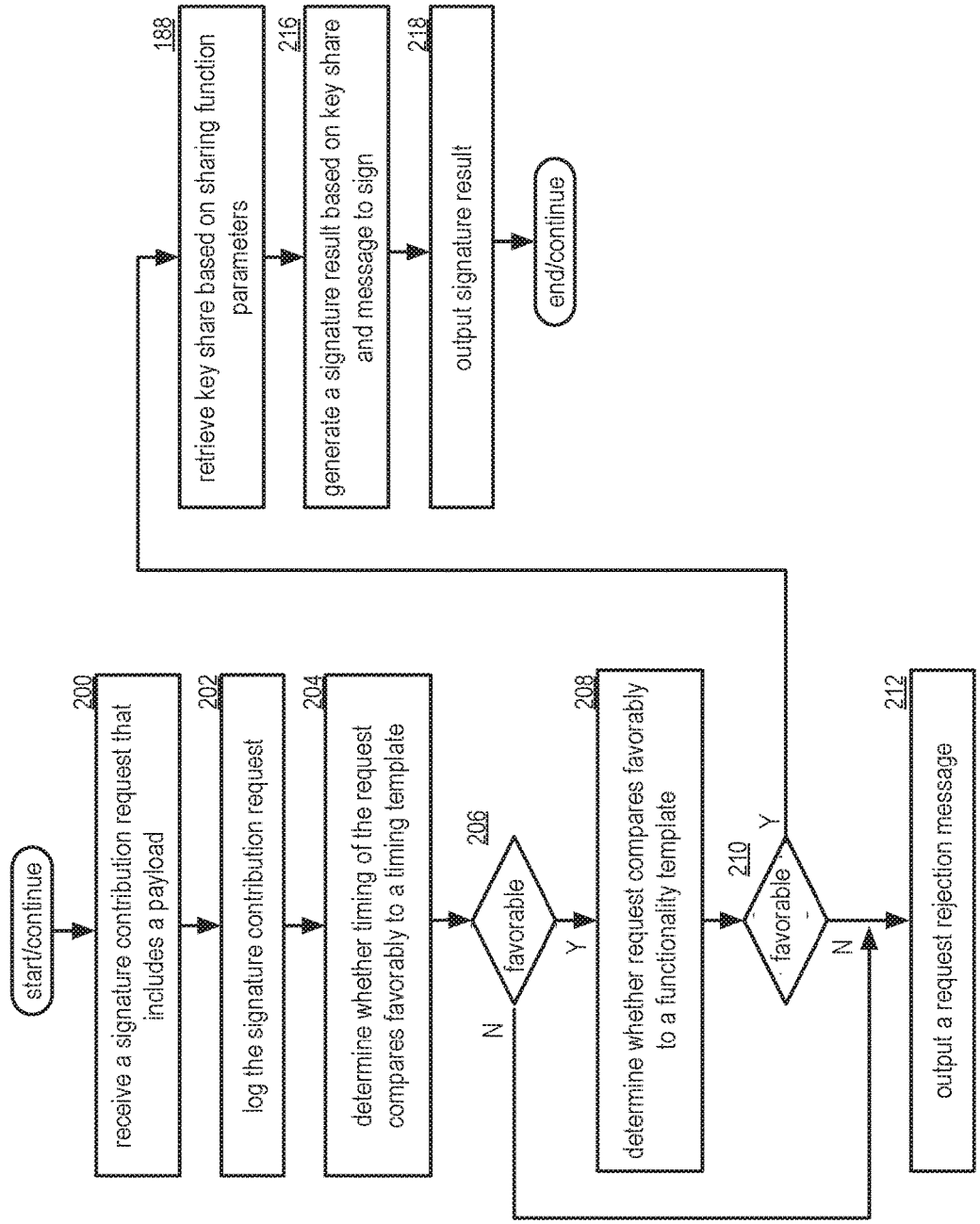
FIG. 10 is a flowchart illustrating another example of generating a signature contribution in accordance with the invention.

FIG. 10 is a flowchart illustrating another example of generating a signature contribution, which include steps similar to FIG. 9D. The method begins with step 200 where a processing module receives a signature contribution request that includes a payload. The method continues at step 202 where the processing module logs the signature contribution request. Such logging includes extracting request information from the signature contribution request, obtaining a user identifier (ID), obtaining a vault ID, obtaining a timestamp, aggregating the request information, the user ID, the vault ID, and the timestamp to produce logging information, and facilitating storing of the logging information.

The method continues at step 204 where the processing module determines whether timing of the signature contribution request compares favorably to a timing template. For example, the processing module determines that the comparison is favorable when a difference between the timestamp associated with the signature contribution request and a timestamp associated with a previous signature contribution request is greater than a time threshold of the timing template. The method branches to steps 204 where the processing module determines whether the request compares favorably to a functionality template, and when the processing module determines that the timing of the request does not compare favorably to the timing template the method continues to step 206 when the processing module determines that the timing of the request compares unfavorably to the timing template. The method continues at step 212 where the processing module outputs a request rejection message. Such a request rejection message includes one or more of the signature contribution requests, the logging information, the timestamp associated with the signature contribution request, and an error code. The processing module may output the request rejection message to one or more of a requester, a dispersed storage (DS) imaging unit, a DS processing unit, a DS unit, and a user device.

The method continues at step 208 where the processing module determines whether the signature contribution request compares favorably to the functionality template. Such a determination may be based on one or more of the payload, a payload analysis, and a comparison of the payload analysis to the functionality template. For example, the processing module determines that the request compares favorably to the functionality template when the processing module determines that a registry value of the payload does not conflict with a current registry value. As another example, the processing module determines that the request compares favorably to the functionality template when the payload is not a certificate authority certificate. As yet another example, the processing module determines that the request compares favorably to the functionality template when an internet protocol (IP) address associated with a requester of the request does not compare unfavorably to an unfavorable IP address list.

The method branches to step 188 of FIG. 9D where the processing module retrieves a key share based on sharing function parameters when the processing module determines that the request compares favorably to the functionality template. The method continues to step 210 when the processing module determines that the request compares unfavorably to the functionality template. The method continues at step 212 where the processing module outputs the request rejection message. The method continues with the steps of FIG. 9D where the processing module retrieves the key share based on sharing function parameters, generates a signature result based on the key share and message to sign, and outputs the signature result.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a processing module of one or more computing devices of a storage network, the method comprises:
    receiving, at the processing module, a first signature contribution request, wherein the first signature contribution request includes a payload, wherein the payload includes error encoding parameters for a storage network storage vault;
    logging, by the processing module, the first signature contribution request, wherein the logging includes a timestamp for the first signature contribution request;
    determining, by the processing module, whether the timestamp of the first signature contribution request falls within the time threshold of a timing template, wherein the timing template comprises a time threshold for consecutive signature contribution requests;
    when the timestamp of the first signature contribution request does not fall within the time threshold of the timing template, outputting, by the processing module, a first signature contribution request rejection message;
    when the timestamp of the first signature contribution request falls within the time threshold of the timing template, determining, by the processing module, based at least partially on an analysis of the payload, whether the first signature contribution request does not conflict with a functionality template, wherein a functionality template comprises one or more function parameters for sharing data associated with a signature contribution request;
    when the first signature contribution request does not conflict with the functionality template, retrieving, by the processing module, a key share based on sharing function parameters and outputting a signature result; and
    when the first signature contribution request conflicts with the functionality template, outputting, by the processing module, a second signature contribution request rejection message.

2. The method of claim 1, wherein the logging further includes at least one of extracting request information from the first signature contribution request, obtaining a user identifier (ID), obtaining a vault ID, aggregating the request information, the user ID and the vault ID to produce logging information, and facilitating storing of the logging information.

3. The method of claim 1, wherein the determining whether the timestamp of the first signature contribution request falls within the time threshold of a timing template is based at least in part on a difference between the timestamp associated with the first signature contribution request and a timestamp associated with a second signature contribution request.

4. The method of claim 3, wherein the timestamp associated with the second signature contribution request is earlier in time than the first signature contribution request.

5. The method of claim 1, wherein the first signature contribution request rejection message includes at least one of at least a portion of a logging information, the timestamp associated with the first signature contribution request and an error code.

6. The method of claim 1, further comprising:
    outputting, by the processing module, the first signature contribution request rejection message to at least one of requester, a dispersed storage (DS) imaging unit, a DS processing unit, a DS unit, and a user device.

7. The method of claim 1, further comprising:
    generating, by the processing module, a signature, wherein the generating the signature is based on a key share result.

8. The method of claim 1, wherein the determining, that the first signature contribution request does not conflict with the functionality template is based on the processing module determining that the payload is not a certificate authority certificate.

9. The method of claim 1, wherein the determining, that the first signature contribution request does not conflict with the functionality template is based on a internet protocol (IP) address associated with a requester of the first signature contribution request does not match an IP address in an unfavorable IP address list.

10. The method of claim 1, wherein the analysis of the payload includes a comparison of the payload analysis to the functionality template.

11. The method of claim 1, wherein the analysis of the payload results in a registry value for the payload.

12. A computer readable memory device comprises:
    at least one memory section that stores operational instructions that, when executed by a processing module of a computing device of a storage network, causes the one computing devices to:
    receive a first signature contribution request, wherein the first signature contribution request includes a payload, wherein the payload includes registry information;
    log the first signature contribution request in a log, wherein the log includes a timestamp for the first signature contribution request;
    determine whether the timestamp of the first signature contribution request falls within the time threshold of a timing template, wherein the timing template comprises a time threshold for consecutive signature contribution requests;
    when the timestamp of the first signature contribution request does not fall within the time threshold of the timing template, outputting a first signature contribution request rejection message; when the timestamp of the first signature contribution request falls within the time threshold of the timing template, determine, based at least partially on an analysis of the payload, whether the first signature contribution request does not conflict with a functionality template, wherein a functionality template comprises one or more function parameters for sharing data associated with a signature contribution request;

when the first signature contribution request does not conflict with the functionality template, retrieve a key share based on sharing function parameters and outputting a signature result; and when the first signature contribution request conflicts with the functionality template, output a second signature contribution request rejection message.

13. The computer readable memory device of claim 12, wherein the at least one memory section further stores operational instructions that, when executed by the processing module further causes the computing device to at least one of:

extract request information from the first signature contribution request for the log;
obtain a user identifier (ID) for the log;
obtain a vault ID for the log;
facilitate storing of & logging information; and
aggregate the request information for the log with the user ID, the vault ID, and the timestamp to produce logging information.

14. The computer readable memory device of claim 12, wherein the at least one
memory section further stores operational instructions that, when executed by the processing
module further causes the computing device to: determine whether the timestamp of the first signature contribution request falls within the time threshold of a timing template based at least in part on a difference between the timestamp associated with the first signature contribution request and a timestamp associated with a second signature contribution request.

15. The computer readable memory device of claim 14, wherein the timestamp associated with the second signature contribution request is earlier in time than the first signature contribution request.

16. The computer readable memory device of claim 12, wherein the first signature contribution request rejection message includes at least one of at least a portion of a logging information, the timestamp associated with the first signature contribution request and an error code.

17. The computer readable memory device of claim 12, wherein the at least one memory section further stores operational instructions that, when executed by the processing module further causes the computing device to:

output the signature contribution request rejection message to at least one of requester, a dispersed storage (DS) imaging unit, a DS processing unit, a DS unit, and a user device.

18. The computer readable memory device of claim 12, wherein the at least one memory section further stores operational instructions that, when executed by the processing module further causes the computing device to:

determine that the first signature contribution request does not conflict with the functionality template based on at least one of:
a determination that a registry value of the payload does not conflict with a current registry value; a determination that the payload is not a certificate authority certificate and a internet protocol (IP) address associated with a requester of the first signature contribution request does not match an IP address in an unfavorable IP address list.

19. The computer readable memory device of claim 12, wherein the at least one memory section further stores operational instructions that, when executed by the processing module further causes the computing device to:

generate a signature, wherein the signature is based at least partially on a key share result.

20. The computer readable memory device of claim 12, wherein the analysis of the payload includes a comparison of the payload analysis to the functionality template.

\* \* \* \* \*